United States Patent
Wen et al.

(10) Patent No.: US 8,082,053 B2
(45) Date of Patent: *Dec. 20, 2011

(54) AUTOMATED MANUFACTURING SYSTEM

(75) Inventors: Xin Wen, Palo Alto, CA (US); Russ Ennio Muzzolini, San Carlos, CA (US); Jeff D. Boone, Sunnyvale, CA (US)

(73) Assignee: Shutterfly, Inc., Redwood City, CA (US)

( * ) Notice: Subject to any disclaimer, the term of this patent is extended or adjusted under 35 U.S.C. 154(b) by 1079 days.

This patent is subject to a terminal disclaimer.

(21) Appl. No.: 11/935,320

(22) Filed: Nov. 5, 2007

(65) Prior Publication Data

US 2008/0288521 A1    Nov. 20, 2008

Related U.S. Application Data

(63) Continuation of application No. 11/737,528, filed on Apr. 19, 2007, now Pat. No. 7,317,960.

(51) Int. Cl.
*G06F 19/00* (2011.01)
(52) U.S. Cl. .............. 700/99; 700/28; 700/102
(58) Field of Classification Search ............ 700/28, 700/99–102, 108–109, 121
See application file for complete search history.

(56) References Cited

U.S. PATENT DOCUMENTS

| | | | |
|---|---|---|---|
| 5,050,088 A | 9/1991 | Buckler | |
| 5,337,880 A | 8/1994 | Claycomb | |
| 5,996,316 A | 12/1999 | Kirschner | |
| 6,564,113 B1 | 5/2003 | Barto | |
| 6,637,473 B2 | 10/2003 | Ganz | |
| 6,731,998 B2 | 5/2004 | Walser | |
| 6,957,116 B2 | 10/2005 | Tsai | |
| 7,092,775 B2 | 8/2006 | Nomoto | |
| 7,242,993 B2 * | 7/2007 | Wen et al. ............ 700/99 |

* cited by examiner

*Primary Examiner* — Albert Decady
*Assistant Examiner* — Douglas Lee
(74) *Attorney, Agent, or Firm* — Xin Wen (57) ABSTRACT

An automated manufacturing system comprises a computer processing system and a plurality of consolidation systems. The computer processing system receives information on product subbatches and product packages and consolidation status information to produce consolidation assignment information, each product package comprising one or more product subbatches. The consolidation systems receive the product subbatches in accordance to the consolidation assignment information and consolidate the product subbatches into product packages, wherein the status of the consolidation systems are tracked and the consolidation status information is sent to the computer processing system.

20 Claims, 10 Drawing Sheets

AUTOMATED MANUFACTURING SYSTEM

CROSS-REFERENCES TO RELATED APPLICATIONS

The present application is a continuation application of and claims priority to commonly assigned U.S. patent application Ser. No. 11/737,528 filed on Apr. 19, 2007 now U.S. Pat. No. 7,317,960, titled "Automated manufacturing system", which claims priority to commonly assigned U.S. patent application Ser. No. 10/784,488, filed on Feb. 23, 2004, titled "Automated manufacturing system". The present application is also related to commonly assigned U.S. patent application Ser. No. 10/446,375, filed on May 28, 2003, titled "Apparatus and method for high-throughput and flexible printing". The disclosure of these related applications are incorporated herein by reference.

TECHNICAL FIELD

This disclosure relates to methods and systems for automated manufacturing and finishing of product packages and product subbatches.

BACKGROUND

Common manufacturing systems are organized in batches or workflows. In batch production, the products are produced in one group at a time. In a workflow, a product is produced in sequential steps. The throughput of a manufacturing workflow is governed by the throughputs of the individual manufacturing steps as well as the wait times in between the steps. The latter is determined by how efficiently the product subbatches are scheduled and distributed throughout the manufacturing system. The cost of manufacturing is related to several factors: the efficiency of the equipment usage, the amount of labor, and the cost and waste of material usage. The cost of manufacturing can also be affected by the product delivery time. In an on-demand fulfillment business, customers may be willing to pay a premium price for fast turn around and may demand a penalty for late shipment.

A manufacturing system can produce products within the system, and can also receive parts from outside the system and completes the product packages in the manufacturing system. Each final product can include several product subbatches. After the product subbatches are produced or received, the product subbatches are packaged into final product packages for shipment. Packaging and shipping costs can be reduced by consolidating several product subbatches into a single product package. The consolidation step however often creates delays and bottlenecks to the manufacturing workflow, which increases the labor cost, equipment costs, and sometimes material and shipping costs.

There is therefore a need for an efficient manufacturing system that can fulfill products in short delivery times at low costs.

SUMMARY

In one aspect, the present invention discloses an automated manufacturing system, comprising a) a computer processing system that defines product packages and one or more product subbatches within each product package in response to input product information; and b) a plurality of consolidation systems that receive the product subbatches in accordance to consolidation assignment and consolidate the product subbatches into product packages, wherein the computer processing system receives the status information of the consolidation systems and produces consolidation assignment.

In another aspect, the present invention discloses a method of automated manufacturing, comprising a) defining product packages and one or more product subbatches within each product package in response to input product information;

b) tracking the status of a plurality of consolidation systems to produce consolidation status information;

c) producing consolidation assignment in accordance to the consolidation status information;

d) distributing product subbatches to the consolidation systems in accordance to the consolidation assignment; and e) consolidating the product subbatches into product packages at the assigned consolidation systems.

In yet another aspect, modes of operations are disclosed to improve the efficiency of automated manufacturing system having consolidation systems. The rescue mode prevents consolidation systems from being overly loaded. The matchmaking mode matches product subbatches in the consolidation systems and effectively clears up the consolidation systems. The basic mode ensures loads to be evenly assigned to the consolidation systems and none of the consolidation system being overwhelmed and becoming a bottleneck.

An advantage of the present invention is that the automated manufacturing method and system the throughput of manufacturing workflow is improved by properly monitoring the status of the consolidation systems and intelligently scheduling product subbatches to avoid bottlenecks at consolidation systems.

Another advantage of the present invention is that the automated manufacturing method and system shorten product delivery time and reduce manufacturing costs.

Yet another advantage of the present invention is that the throughput of the automated manufacturing system is increased.

DETAILED DESCRIPTION

Figure 1:
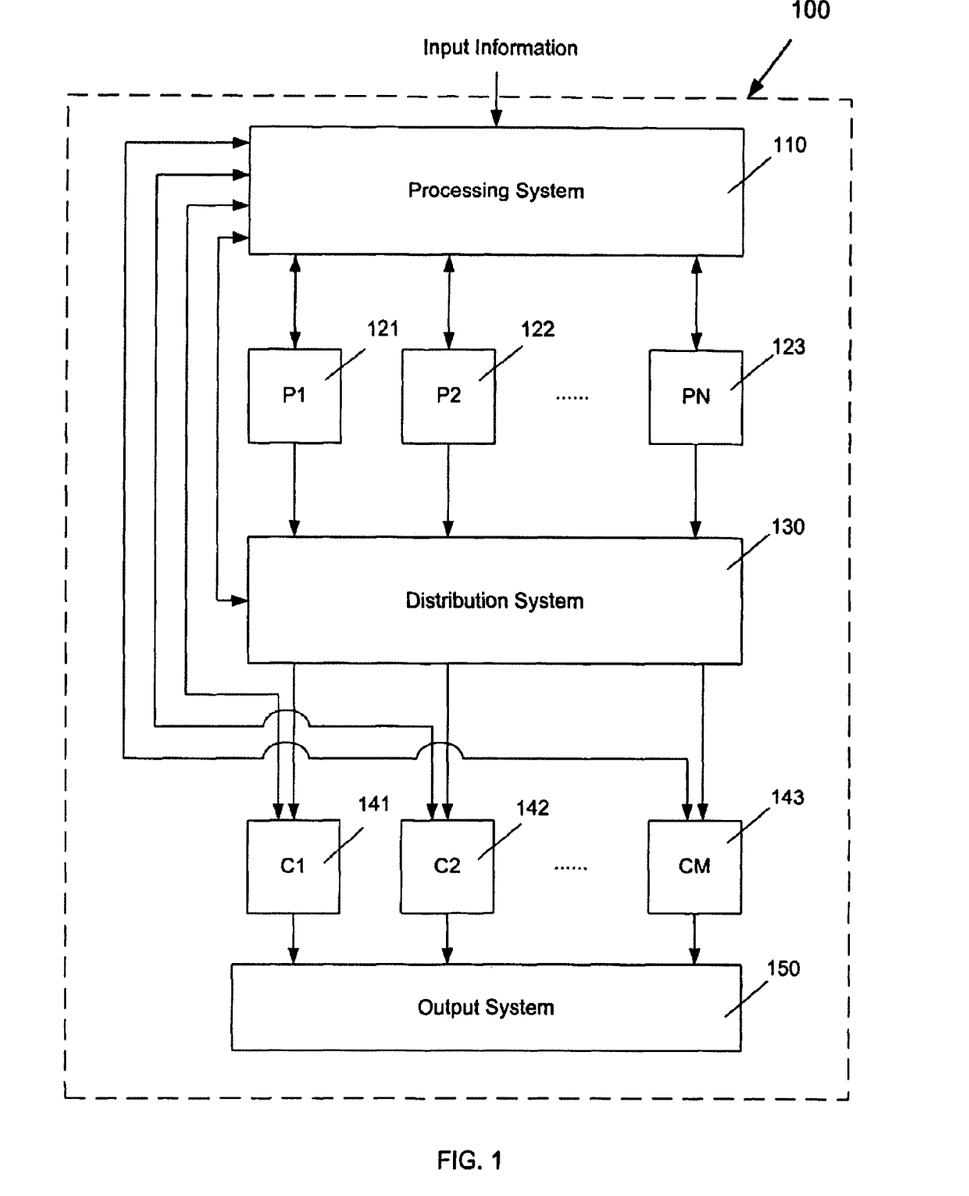
FIG. 1 is a block diagram for an automated manufacturing system in accordance with the present invention.

In accordance with the present invention, as shown in FIG. 1, an automated manufacturing system 100 includes a computer processing system 110, one or more production systems 121, 122, 123, a distribution system 130, one or more consolidation systems 141, 142, 143, and an output system 150. For example, the production systems 121, 122, 123 can include digital printers that can produce hardcopy prints in response to input digital data. Examples of digital printers include digital silver halide printers, digital electrographic printers, ink jet printers, digital thermal dye printers, and digital offset printing presses and so on.

Product information is received by the computer processing system 110 as the input to the automated manufacturing system 100. The input information can include order information such as product type, quantity, and the orderer information for each product order. The input information can also include digital data for producing the products such as image data, and print layout data for making digital prints in the order. The input information can include network addresses and database locations where digital data are stored. Each order may include several product package, each of which may be sent to same or different shipping addresses. Each product package may include more than one product subbatch, each of which is to be separately scheduled and produced by production system 121-123. The computer processing system 110 processes the input information to produce digital data necessary for producing product subbatches and product packages.

A product subbatch may include several product units. For example, a product subbatch can include a group of 10 4"×6" photographic prints. A product subbatch may also include more than one product. For example, a product subbatch may include 20 4"×6" prints and 5 5"×7" prints, which are both printed by production system 121 (P1) and then held together by an inner envelope before being delivered to consolidation systems 141,142,143 by the distribution system 130.

The computer processing system 110 separates the production of the products in one package into the production of multiple product subbatches. The separation of product subbatches can be based on a number of factors such as the product types, the quantity of each product type, the product size (relative to the compartment size in the consolidation systems, see below), etc. The number of product units and product types in product subbatches are arranged such that the product subbatches can be conveniently produced and distributed in a group. Product subbatches assigned to the same product package are referred to as companion product subbatches within the product package. A product subbatch can include a plurality of product types such as image prints, greeting cards, postcards, calendars, photo snapbooks, and photo albums.

Figure 2:
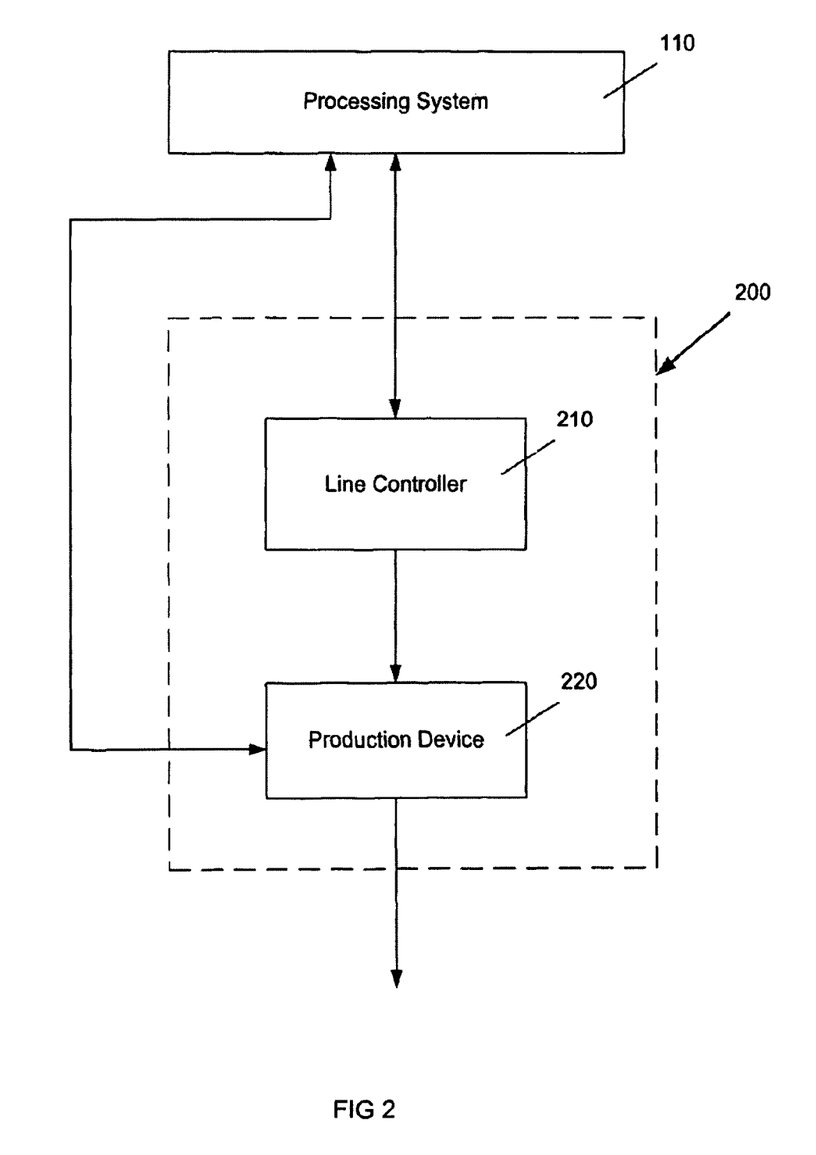
FIG. 2 illustrates the components of a production system in the automated manufacturing system of FIG. 1.

The computer processing system 110 sets priorities for the production of the product subbatches and schedule the product subbatches to the production systems 121,122,123. The components of production systems 121,122,123 are shown in FIG. 2. A production system 200 includes a line controller 210 and a production device 220. The line controller 210 receives product information from the computer processing system 110. The line controller 210 also sends information such as printer status, product subbatch status, error message, etc. back to the computer processing system 110. The product device 220 produces the product subbatches assigned by the computer processing system 110. Details of the operation of the line controller 210, the computer processing system 110, and the scheduling of product subbatches are disclosed in the above mentioned and commonly assigned U.S. patent application Ser. No. 10/446,375, filed on May 28, 2003, titled "Apparatus and method for high-throughput and flexible printing". The disclosures of this application are incorporated herein by reference.

The production systems 121,122,123 produce the product subbatches in accordance to the digital data received from the computer processing system 110. At the completion of the product subbatches at the production systems, the product subbatches are sent to the distribution system 130. The distribution system 130 then distributes the product subbatches to the consolidation systems 141,142,143 in accordance with consolidation assignment information produced by the computer processing system 110. The consolidation systems 141, 142,143 consolidate the product subbatches into product packages. The product packages are then sent to the output system 150 for shipment.

Figure 3:
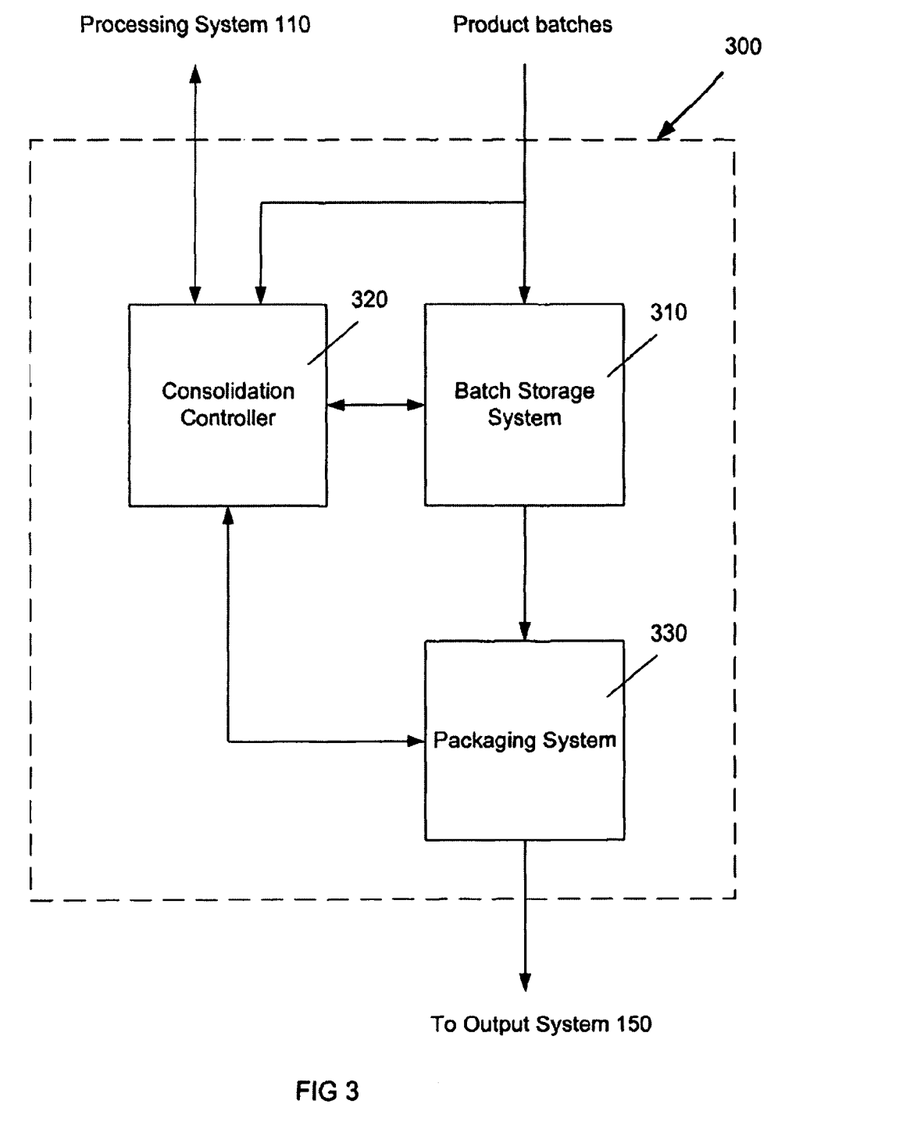
FIG. 3 illustrates the components of a consolidation system in the automated manufacturing system of FIG. 1.

Components of the consolidation systems 141-143 are illustrated in FIG. 3. A consolidation system 300 includes a consolidation controller 310, a batch storage system 320, and a packaging system 330. The consolidation controller 310 can include a computer, display device, a keyboard, a barcode scanner, a voice recognition device, a speaker etc. The batch storage system 320 stores product subbatches in separate compartment before all the companion subbatches belonging to a product package are delivered to the consolidation system 300. In accordance to the present invention, the compartments in the consolidation systems 300 can exist in different forms. The can be referred to as holding bins, cubbies, etc.

The consolidation controller 310 detects each product subbatch delivered to the consolidation system 300 and assigns the product subbatch to a specific compartment or holding bin. The status and the location of the product subbatch is reported to the processing system 110 and updated on a computer database. The packaging system 330 can includes a scale, a printer, and a barcode scanner. When all the product subbatches of a product package have arrived at the consolidation system 300, the packaging system 330 packs the product subbatches in one package. The product package may be weighed and a shipping label may be printed and applied to the product package. Again, the shipping status of the product package and associated product subbatches is reported and updated by the consolidation controller 320 to processing system 110.

The consolidation system 300 can exist in different configurations in accordance with the present application. In one embodiment of the present invention, the batch storage system 310 includes a plurality of cubbies stacked in rows and columns. Each cubby is uniquely specified by an address. The addresses for the cubbies may be identified by a barcode label next to the cubby, electronic display, or a radio-frequency tag. Each cubby can hold one product subbatch or all the product subbatches for a product package. An electronic detection and indicator can be provided for each cubby. For example, an LED indicator can be provided. A green light may signify an empty cubby, a yellow light for a partially fulfilled product package in the cubby (still waiting for companion product subbatches), and a blue light indicates the product package in the cubby is completed and ready to be packaged. The status of all the cubbies is tracked by the consolidation controller 320 as part of the consolidation status information of the consolidation system 300, which is reported to processing system 110.

In another embodiment of the present invention, the consolidation system 300 includes a plurality of holders all connected and movable by an automated conveying mechanism. The movable holders can be distributed vertically to save space on the production floor. Each holder is uniquely identifiable. Each holder can hold one or more product subbatches belonging to a product package. There may be an upper limit in the product subbatches that a holder can hold. When the upper limit is reached, product subbatches belonging to the same product package may be distributed to different holders. The product subbatches and their holder locations are tracked by the consolidation controller 320. When all the product subbatches of one product package have been received by the consolidation system 300, the product subbatches are automatically moved and placed onto an area in the packaging system 330. The product subbatches are packaged and labeled and then sent to the output system 150.

The status information of the consolidation systems 141, 142, 143 include the product subbatches and their cubby/holder locations stored in each consolidation system, their companion product subbatches, the product type and unit numbers of the product subbatches and their companion product subbatches. The consolidation status information also includes information on finished or completed product packages, the dwell time of the product subbatches presently stored in the consolidation systems 141-143, and how much room is left in each of the consolidation systems for new product packages.

In accordance with the present invention, the dwell time is used to describe the time that a product subbatch is held in a compartment of a consolidation system 300, that is, the time duration between the time when the product subbatch was placed into the compartment and the time when it is taken out of the compartment to be packaged with the rest of the companion product subbatches.

The consolidation status information is frequently updated to the computer processing system 110. Based on the consolidation status information and the rules as described in more detail below, the computer processing system 110 determines which of the consolidation system 141-143 that the new product subbatches will be assigned (i.e. consolidation assignment information). As described below, the consolidation status information also allows the computer processing system 110 to schedule future product subbatches to be produced to decrease the load level in the consolidation systems. In the present invention, the load level in the consolidation system refers to the number of compartment that are occupied by product subbatches relative to the total number of compartment in a consolidation system.

The consolidation system receives product subbatches from the distribution system 130. If all the product subbatches of a product package have been received at a consolidation system, the product subbatches are packaged and sent to the output system 150. If any product subbatch in the package has not arrived, the package will be held at the consolidation system, waiting for companion product subbatches to arrive. During the peak hours of production, it is possible that all the holders/cubbies in a consolidation system are all occupied by the product subbatches waiting for companion product subbatches. The specific order consolidation is no longer usable and can become a bottleneck to the whole automated manufacturing system 100. Advantage that the present invention provides is the decrease of dwell times of the product subbatches in the consolidation systems 141-143.

Figure 4:
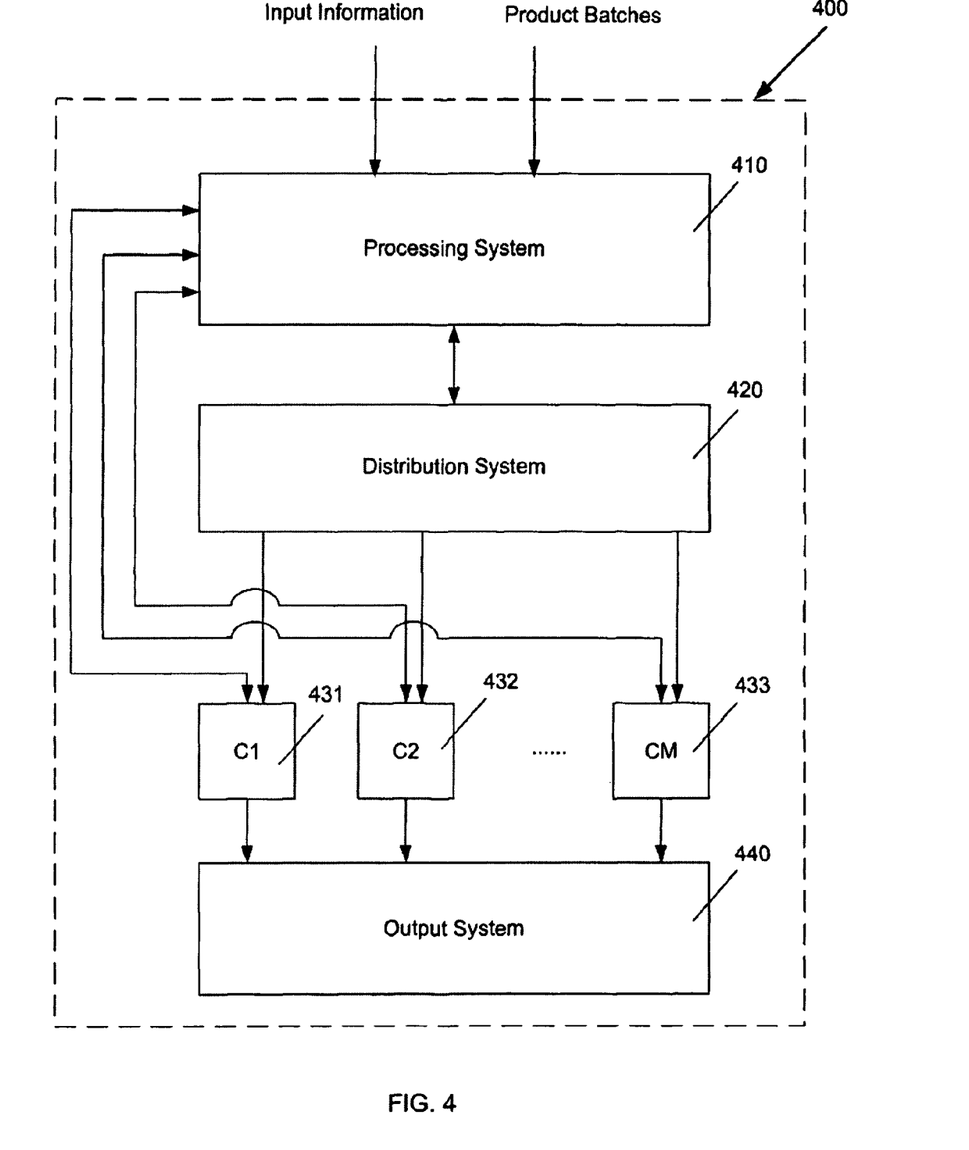
FIG. 4 is a bock diagram of an automated product distribution system in accordance with another embodiment of the present invention.

In accordance with another embodiment of the present invention, as shown in FIG. 4, the automated manufacturing system 400 includes a computer processing system 410, a distribution system 420, one or more consolidation systems 431, 432, 433, and an output system 440. The product subbatches are externally produced and provided to the automated manufacturing system 400. Similar to the automated manufacturing system 100 of FIG. 1, input information is also received by processing system 410 from outside. Consolidation status information is similarly updated from the consolidation systems 431 through 433 to the processing system 410. Using the input information and the status information from the consolidation systems 431 through 433, the computer processing system 410 sets priorities for product subbatches, schedules the product subbatches to the distribution system 430 and assigns the product subbatches to the consolidation systems 431-433. The distribution system 430 takes the distribution information from the computer processing system 420 and distributes product subbatches to the consolidation systems 431 through 433. Product subbatches assigned with higher priorities will be produced sooner than lower priority product subbatches.

Figure 5:
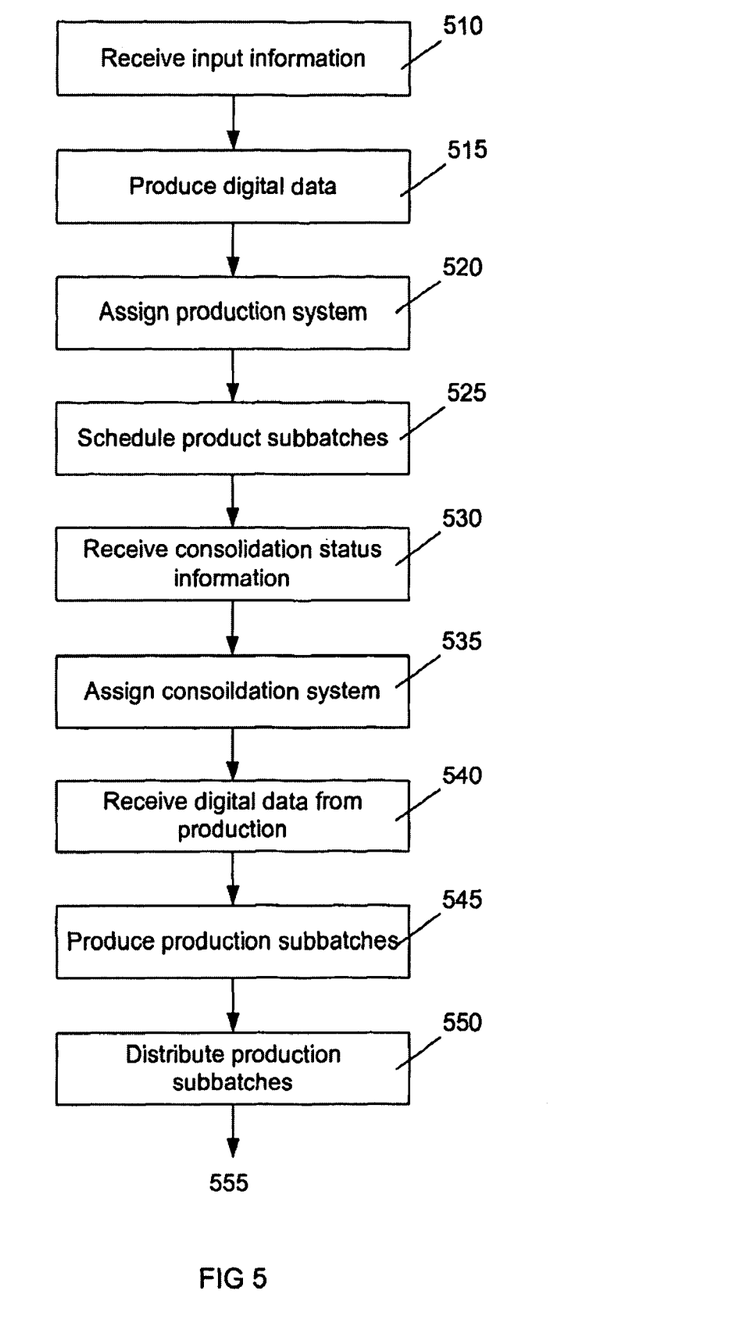
FIG. 5 is a flow diagram for the operations of the automated manufacturing system in accordance with the present invention.

FIG. 5 is a flow chart for the automated manufacturing system 100 in accordance with the present invention. Input information is received by the computer processing system 110 in step 510. Based on the input information, the computer processing system 110 produces digital data for producing product subbatches in step 515. The computer processing system 110 assigns the production systems 121-123 for producing the product subbatches in step 520 and schedules the production time in step 525. Rules for the assignment and scheduling of product subbatches will be discussed below in details in relation to FIGS. 6 to 9.

The processing system 110 receives the consolidation status information from the consolidation systems 141-143 in step 530. Accordingly, the computer processing system 110 assigns the consolidation systems 141-143 for receiving product subbatches of new product packages or specify the consolidation systems 141-143 where their companion product subbatches are stored (step 535).

In step 540, the distribution system 130 receives digital data for producing the products from the computer processing system 110. For example, the digital data may specify the size and the quantity of photographic prints a production system 121-123 to produce for a product subbatch. The product subbatch is produced by the production system (step 545). Based on the consolidation assignment information, the distribution system 130 distributes the product subbatches to the consolidation systems in step 550.

In step 555, the consolidation systems 121, 122, 123 receive product subbatches. The consolidation controller 320 (FIG. 3) logs the reception of the product subbatches in step 560. The consolidation system checks if all the companion subbatches have been in the consolidation system in step 575. If all the companion subbatches have been in the consolidation system, the consolidation system consolidates the product subbatches into one product package in step 580. The consolidation status information is updated. The product subbatch is delivered to output system 150 (step 585). If the consolidation system determines that a product subbatch it has received has companion subbatches in step 565 and that not all the companion subbatches have arrived at the consolidation system (step 575), the consolidation system will hold the product subbatches in a holder or cubby in the batch storage system 310 as described above. The consolidation system is ready receive more product subbatches in step 555.

Although the flowchart of FIG. 5 is discussed above in relation to the automated manufacturing system 100 FIG. 1, the flowchart is also generally applicable to the automated manufacturing system 400 with the exclusion of the steps 515, 520, 525.

The assignment of the production system (step 520) and the assignment of the consolidation systems (step 535) require the consolidation status information from the consolidation systems 141-143. Depending on the status of each consolidation system, the computer processing system 110 assigns different product subbatches to different priorities, and schedules the product subbatches to be produced according to the assigned priorities. The computer processing system 110 assigns different consolidation systems for product subbatches from the assigned production systems. The computer processing system 110 conducts these assignments using predetermined sets of rules and algorithms. Several modes of assignment rules and algorithms for order consolidation are described below in relation to FIGS. 6-9 in accordance with the present invention.

Figure 6:
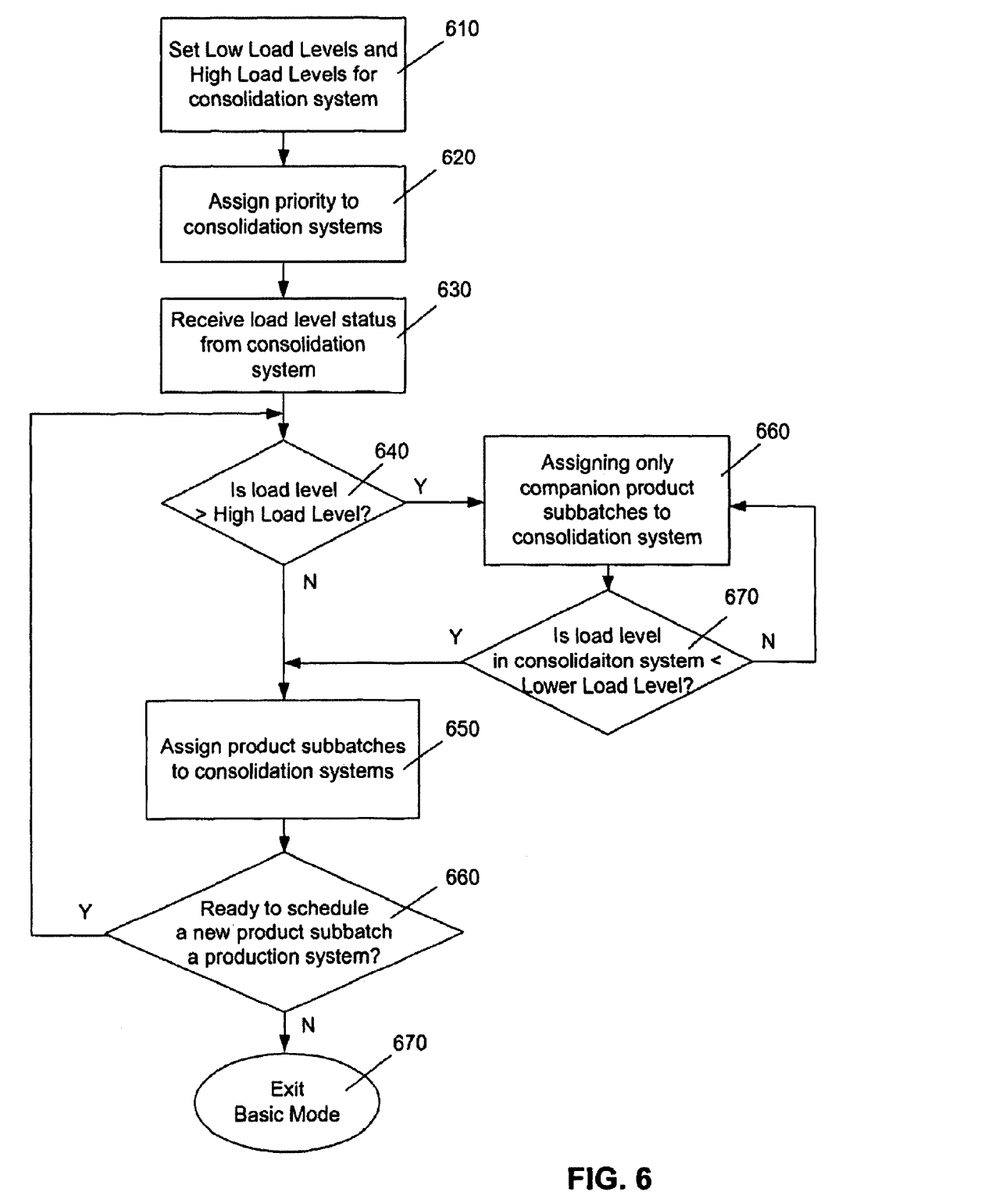
FIG. 6 is a flow diagram for the operations of the automated manufacturing system in accordance with an embodiment of the present invention.

In accordance with an embodiment of the present invention, FIG. 6 illustrates a flowchart for a basic mode of order consolidation for the automated manufacturing system 100 and the automated manufacturing system 400. The computer processing system 110 sets a Low Load Level (LLL) and a High Load Level (HLL) for a consolidation system (step 610). LLL and HLL may depend on the capacity consolidation system as well as the throughput of the production systems 121-123. The computer processing system 110 also assigns a priority ordering to the consolidation system 121-123 (step 620). The computer processing system 110 receives the consolidation status information from the consolidation systems (step 630).

The computer processing system 110 checks in step 640 if a consolidation system 121-123's load level is higher than its HLL. If its load level is not higher than its HLL for any of the consolidation systems 121-123, the computer processing system 110 assigns product subbatches of new or existing product packages (step 650). Naturally, the companion product subbatches will be assigned to the consolidation system where its companion product subbatch(es) is stored. The assignment of product subbatches from new product packages can follow different rules. For example, a pre-determined priority can be set for the consolidation systems 121-123 in the sequence of 121>122>123. The product subbatch from a new product package will be assigned to the consolidation system 121. In another example, the product subbatches from new product packages can be assigned to the consolidation system having the lowest load levels.

If a consolidation system's load level is higher than HLL (step 640), the computer processing system 110 will not assign any new product packages to the consolidation system, but only assign companion subbatches of the product subbatches already stored in the consolidation system (step 660). If all the product subbatches from a product package have been received at the consolidation system, all the product subbatches of the same product package are removed from the cubbies. The product subbatches are packaged and the product package is finished. The load level of the consolidation system is therefore reduced. The computer processing system 110 then checks in step 670 if the load level of the consolidation system is lower than its LLL. If the load level is not lower than the LLL, the computer processing system 110 continues to assign only companion product subbatches to that consolidation system (step 650). If the load level of the consolidation system is lower than its LLL, the computer processing system 110 can then freely assign product subbatches from new or old product packages to the consolidation system according to the priority of the consolidation system (step 650). If the computer processing system 110 is ready to schedule the next product subbatch (step 660), the process restarts at step 640. If not, the process exits the basic mode of order consolidation (step 670).

Figure 7:
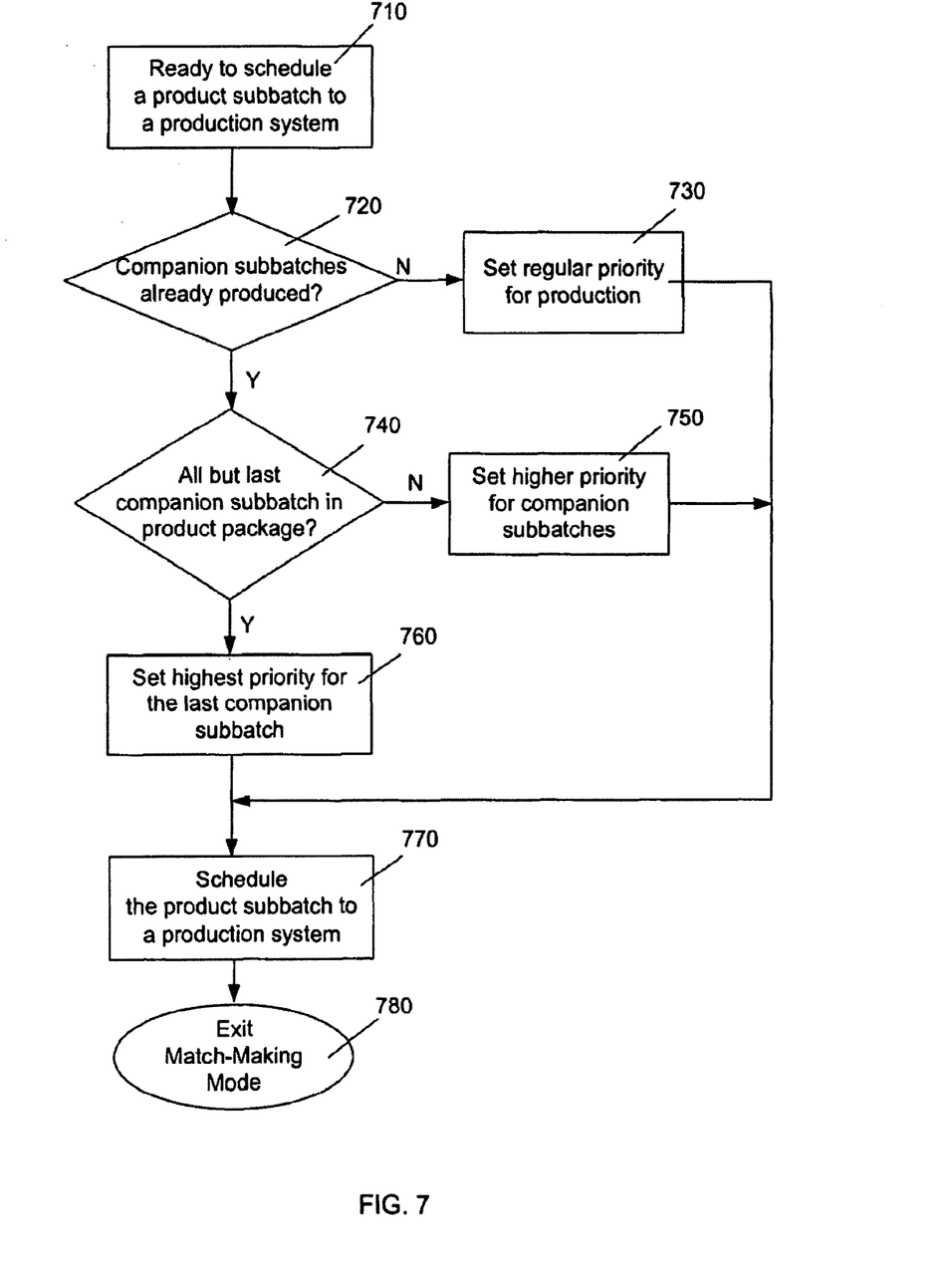
FIG. 7 is a flow diagram for the operations of the automated manufacturing system in accordance with another embodiment of the present invention.

FIG. 7 shows a flow diagram 700 of the match-making mode for the consolidation of product subbatches in automated manufacturing systems 100 and 400. The match-making mode is discussed below using the automated manufacturing systems 100 as an example. The computer processing system 110 is ready to schedule a new product subbatch to be produced by production systems 121-123 and consolidated by consolidation systems 141-143 (step 710). The computer processing system 110 checks if any of companion product subbatches of the new product subbatch has been produced (step 720). If no companion product subbatches have been produced, the computer processing system 110 assigns regular priority values for the consolidation system in step 730. The regular priority for product subbatches may be determined by one or more of factors such as the time of the product order is submitted, the shipping method requested (e.g. regular mail or express mail), deadlines for the product subbatches to be used etc.

If one or more companion product subbatches has been produced (step 720), the produced companion product subbatches may be already stored in a consolidation system or on the way to be assigned to a consolidation system 141-143. The computer processing system 110 subsequently checks in step 740 if the new product subbatch is the last companion product in the product package to be produced. If this is true, the computer processing system 110 assigns the new product subbatch to the highest priority in step 760 so that the last companion product subbatch can arrive at the consolidation system as soon as possible so that the batch storage system 310 can free up one or more holders/cubbies by finishing up the product package. If the product subbatch in consideration is not the last companion product subbatch of the associated product package, the computer processing system 110 assigns a high priority to the product subbatch in step 750. The high priority is higher than the regular number, but lower than the highest. After the priority of the new product subbatch has been assigned, the computer processing system 110 schedules the product subbatch according to the priority setting in step 770. The computer processing system 110 exits match-making mode at step 780 and is now ready to set priority and schedule the next new product subbatch.

Figure 8:
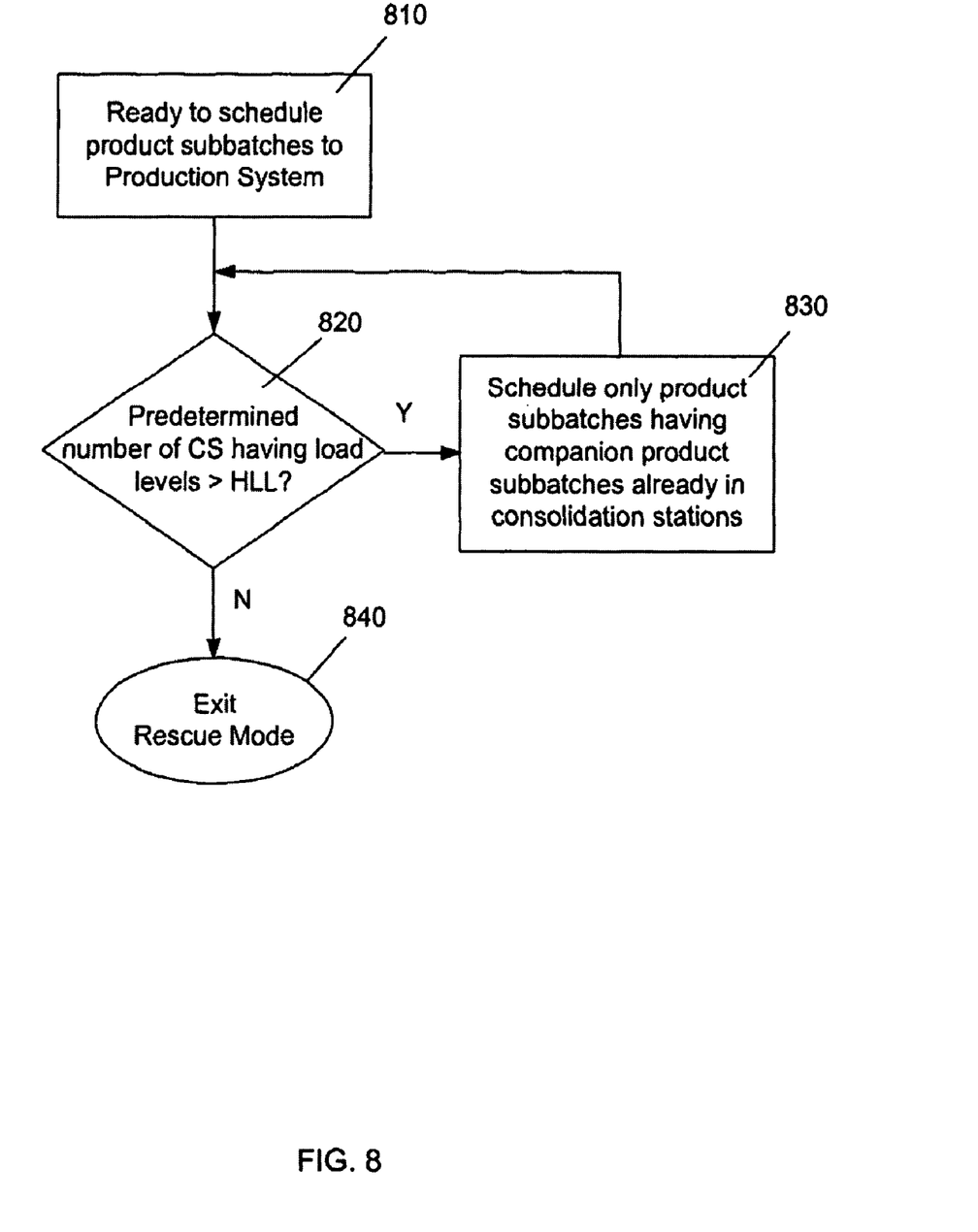
FIG. 8 is a flow diagram for the operations of the automated manufacturing system in accordance with yet another embodiment of the present invention.

The flow chart of another mode of product subbatch consolidation is shown in FIG. 8 in accordance with the present invention. This mode of consolidation is intended to quickly clear up the consolidation systems 141-143 when a large portion of the consolidation systems 141-143 are close to be full in the automated manufacturing system 100 (or 400). It may be referred as rescue mode reflecting its intended purpose. The computer processing system 110 is ready to schedule a new product subbatch to be produced, consolidated, and packaged in step 810. The computer processing system 110 first checks in step 820 if a predetermined number of consolidation systems have their load levels higher than their HLLs. The predetermined number may be for example 70% of the total number of the consolidation systems 141-143. A very high number of consolidation systems having their load levels higher than the HLLs means the consolidation capacity of the whole automated manufacturing system has reached a critical level. If the computer processing system 110 continues assigning product subbatches of the new product packages to the consolidation systems 141-143, there is a good chance that the consolidation systems 141-143 will exceed their capacities. The whole automated manufacturing system 100 will be stalled to a standstill, that is, no product packages can be consolidated, packaged or shipped. In a predetermined number of consolidation systems have their load levels higher than their HLLs (step 820), the computer processing system 110 stops scheduling new product subbatches of the new product packages to the production systems 121-123. Only product subbatches having companion product subbatches already in the consolidation systems will be scheduled (step 830). If the inquired condition is not met in step 820, the computer processing system 110 will exit the rescue mode (step 840).

Figure 9:
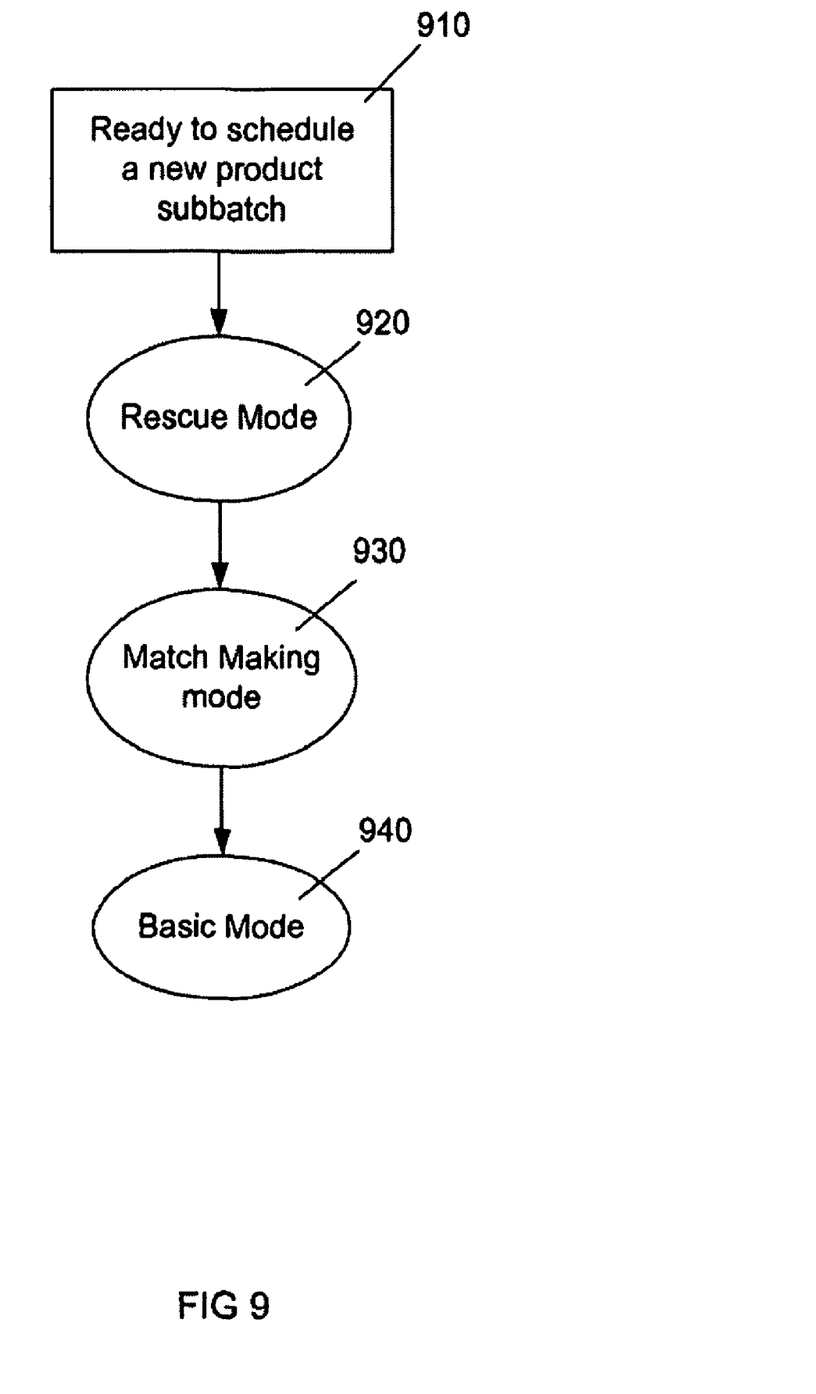
FIG. 9 is a flow diagram for the operations of the automated manufacturing system in accordance with another embodiment of the present invention.

Different consolidation modes described in relation to FIGS. 6-8 can be used separately or in combination. FIG. 9 shows an exemplified flow chart for the rescue mode, the matching making mode and the basic mode. The computer processing system 110 is ready to assign a new product subbatch to be produced, consolidated, packaged and shipped. The new product subbatch maybe the first companion product subbatch to be scheduled or it may follow other companion product subbatches in the system. The computer processing system 110 first enters rescue mode (step 920) and check if rescuing conditions are met in step 820 of FIG. 8. If so, the computer processing system 110 assigns product subbatch in rescue mode. If not, it enters match making mode in step 930 as illustrated in FIG. 7. After the priorities are set for the new product subbatches, the computer processing system 110 enters the basic mode (step 940) to assign product subbatch to consolidation system. Various combinations of consolidation modes are applicable to automated manufacturing systems 100,400. For example, rescue mode can be combined with basic mode without the match making mode.

A number of implementations of the invention have been described. Nevertheless, it will be understood that various modifications may be made without departing from the spirit and scope of the invention. For example, the operations of the processes and methods described here can be performed in a different order and still achieve desirable results. Also, the processes, methods, and systems described here can be used to change a variety of product attributes. Accordingly, other implementations are within the scope of the following claims.

What is claimed is:

1. An automated manufacturing system, comprising
  a computer processing system configured to define a product package comprising two or more product subbatches and to assign a priority level to a product subbatch in the product package, wherein the computer processing system sets the product subbatch to a first priority level if none of companion product subbatches associated with the product subbatch in the product package has been produced and sets the product subbatch to a second priority level higher than the first priority level if at least one companion product subbatch associated with the product subbatch in the product package has been produced; and
  a scheduling system configured to schedule the product subbatch in accordance to the priority level of the product subbatch.

2. The automated manufacturing, system of claim 1, wherein the computer processing system sets the product subbatch to a third priority level higher than the second priority level if all other companion product subbatches associated with the product subbatch in the product package have been produced.

3. The automated manufacturing system of claim 1, further comprising a production system configured to produce the product subbatch in accordance to the priority level assigned by the computer processing system.

4. The automated manufacturing system of claim 3, wherein the production system comprises a digital printer configured to produce a digital printing product to form at least part of the product subbatch.

5. The automated manufacturing system of claim 1, further comprising a consolidation system configured to store the two or more product subbatches associated in the product package.

6. The automated manufacturing system of claim 5, wherein the consolidation system is configured to consolidate and package one or more product subbatches to form the product package.

7. A method for automated manufacturing, comprising:
  defining a plurality of product packages each comprising two or more product subbatches;
  assigning a priority level to a product subbatch in a product package, wherein the step of assigning comprises:
    setting the product subbatch to a first priority level if none of companion product subbatches associated with the product subbatch in the product package has been produced; and
    setting the product subbatch to a second priority level higher than the first priority level if at least one companion product subbatch associated with the product subbatch in the product package has been produced; and
  scheduling the product subbatch in accordance to the priority level of the product subbatch.

8. The method of claim 7, wherein the step of assigning further comprises setting the product subbatch to a third priority level higher than the second priority level if all other companion product subbatches associated with the product subbatch in the product package have been produced.

9. The method of claim 7, further comprising determining if any of the companion product subbatches associated with the product subbatch in the product package has been produced.

10. The method of claim 7, wherein the two or more companion product subbatches comprise a digital printing product.

11. The method of claim 7, further comprising producing the product subbatch according to the priority level of the product subbatch.

12. The method of claim 11, wherein the step of producing comprises printing an image to produce a hardcopy print using a digital printer.

13. The method of claim 11, further comprising:
  storing one or more companion product subbatches associated with the product subbatch in the product package in a consolidation system, if the one or more companion product subbatches associated with the product subbatch in the product package have been produced;
  assigning the product subbatch to the consolidation system; and
  consolidating the product subbatch with its associated companion product subbatches in the consolidation system.

14. The method of claim 13, further comprising:
  packaging the product subbatch and its associated companion product subbatches to form the product package.

15. The method of claim 13, further comprising producing status information that describes the one or more companion product subbatches associated with the product subbatch in the product package are stored in the consolidation system, wherein the product subbatch is assigned to the consolidation system in accordance to the status information.

16. A method of automated manufacturing, comprising:
  defining a plurality of product packages each comprising two or more product subbatches;
  assigning a first product subbatch in a product package to a first priority level;
  scheduling the first product subbatch in accordance to the first priority level;

producing the first product subbatch;
assigning a second priority level to a second product subbatch in the product package, wherein the second priority level is higher than the first priority level; and
producing the second product subbatch in accordance to the second priority level.

17. The method of claim 16, further comprising:
storing first product subbatch in a consolidation system;
assigning the second product subbatch to the consolidation system; and
consolidating the first product subbatch and the second product subbatch in the consolidation system.

18. The method of claim 16, further comprising:
packaging the first product subbatch and the second product subbatch; and
forming the product package comprising the first product subbatch and the second product subbatch.

19. The method of claim 16, wherein the first product subbatch comprises a digital printing product.

20. The method of claim 18, wherein the step of producing the first product subbatch comprises printing an image to produce a hardcopy print using a digital printer.

* * * * *